United States Patent
Vilardell et al.

(10) Patent No.: US 8,764,206 B2
(45) Date of Patent: Jul. 1, 2014

(54) ACCESSORY FOR REFLECTING AN IMAGE FROM A DISPLAY SCREEN OF A PORTABLE ELECTRONIC DEVICE

(75) Inventors: Nick Vilardell, Las Vegas, NV (US); Olav Christensen, Brooklyn, NY (US)

(73) Assignee: 360BrandVision, Inc., Las Vegas, NV (US)

( * ) Notice: Subject to any disclaimer, the term of this patent is extended or adjusted under 35 U.S.C. 154(b) by 70 days.

(21) Appl. No.: 13/478,761

(22) Filed: May 23, 2012

(65) Prior Publication Data

US 2012/0300275 A1    Nov. 29, 2012

Related U.S. Application Data

(60) Provisional application No. 61/489,216, filed on May 23, 2011.

(51) Int. Cl.
*G02B 7/182* (2006.01)
*G06F 1/16* (2006.01)

(52) U.S. Cl.
USPC .................................. 359/871; 361/679.04

(58) Field of Classification Search
USPC .................................................. 361/679.04
See application file for complete search history.

(56) References Cited

U.S. PATENT DOCUMENTS

| | | |
|---|---|---|
| 4,159,417 A | 6/1979 | Rubincam |
| 4,589,659 A | 5/1986 | Yokoi et al. |
| 5,262,926 A | 11/1993 | Hall |
| 5,483,250 A | 1/1996 | Herrick |
| 5,639,151 A | 6/1997 | McNelley et al. |
| 5,777,665 A | 7/1998 | McNelley et al. |
| 5,788,286 A | 8/1998 | Hunt |
| 5,810,316 A | 9/1998 | Eby |
| 5,890,787 A | 4/1999 | McNelley et al. |
| 5,953,052 A | 9/1999 | McNelley et al. |
| 5,970,418 A | 10/1999 | Budd et al. |
| 6,243,130 B1 | 6/2001 | McNelley et al. |
| 6,407,832 B1 | 6/2002 | Holzbach et al. |
| 6,481,851 B1 * | 11/2002 | McNelley et al. ............... 353/28 |
| 6,607,275 B1 | 8/2003 | Cimini et al. |
| 6,650,470 B1 | 11/2003 | Turner et al. |
| 6,783,247 B2 | 8/2004 | White |
| 6,827,448 B2 | 12/2004 | Cimini et al. |
| 6,930,669 B2 | 8/2005 | Weiner et al. |
| 6,934,080 B2 | 8/2005 | Saccomanno et al. |
| 7,034,807 B2 | 4/2006 | Maggioni |
| 7,097,560 B2 | 8/2006 | Okada |
| 7,110,796 B2 | 9/2006 | Lee |
| 7,144,113 B2 | 12/2006 | Fujikawa et al. |
| 7,184,796 B2 | 2/2007 | Karidis et al. |
| 7,187,343 B2 | 3/2007 | Pate |

(Continued)

OTHER PUBLICATIONS

International Search Report and Written Opinion in related international application PCT/US2012/039128, dated Aug. 3, 2012 (12 pages).

*Primary Examiner* — Jade R Chwasz
(74) *Attorney, Agent, or Firm* — Mark S. Leonardo; Brown Rudnick LLP

(57) ABSTRACT

Accessories for portable electronic devices that offer a screen for displaying the contents of a display of the portable electronic devices. For an electronic device, the accessory includes a reflective screen with a material such as a beam splitter to re-display the device display and a mechanism to hold the screen above a horizontal surface at an angle.

7 Claims, 15 Drawing Sheets

(56) References Cited

U.S. PATENT DOCUMENTS

| | | |
|---|---|---|
| 7,242,315 B2 | 7/2007 | Affolter et al. |
| 7,283,181 B2 | 10/2007 | Allen et al. |
| 7,307,675 B2 | 12/2007 | Abileah |
| 7,385,600 B2 | 6/2008 | Marion |
| 7,391,475 B2 | 6/2008 | Pate et al. |
| 7,436,318 B2 | 10/2008 | Affolter et al. |
| 7,460,179 B2 | 12/2008 | Pate et al. |
| 7,528,798 B2 | 5/2009 | Harada et al. |
| 7,604,357 B2 | 10/2009 | May et al. |
| 7,656,586 B2 | 2/2010 | Rosario et al. |
| 7,661,828 B2 | 2/2010 | Allen et al. |
| 7,800,812 B2 | 9/2010 | Moskowitz |
| 7,883,212 B2 | 2/2011 | O'Connell et al. |
| 8,132,670 B1 * | 3/2012 | Chen .............................. 206/320 |
| 2003/0043029 A1 | 3/2003 | Ichikawa et al. |
| 2003/0184958 A1 | 10/2003 | Kao |
| 2008/0037090 A1 | 2/2008 | Miller et al. |
| 2008/0247128 A1 | 10/2008 | Khoo |
| 2008/0316689 A1 | 12/2008 | Moscovitch |
| 2009/0256970 A1 | 10/2009 | Bilbrey et al. |
| 2010/0097439 A1 | 4/2010 | Kroll et al. |
| 2011/0037834 A1 | 2/2011 | Hsiung et al. |
| 2011/0266176 A1 * | 11/2011 | Still .............................. 206/320 |
| 2011/0273364 A1 | 11/2011 | Christensen |
| 2012/0050144 A1 | 3/2012 | Morlock |

* cited by examiner

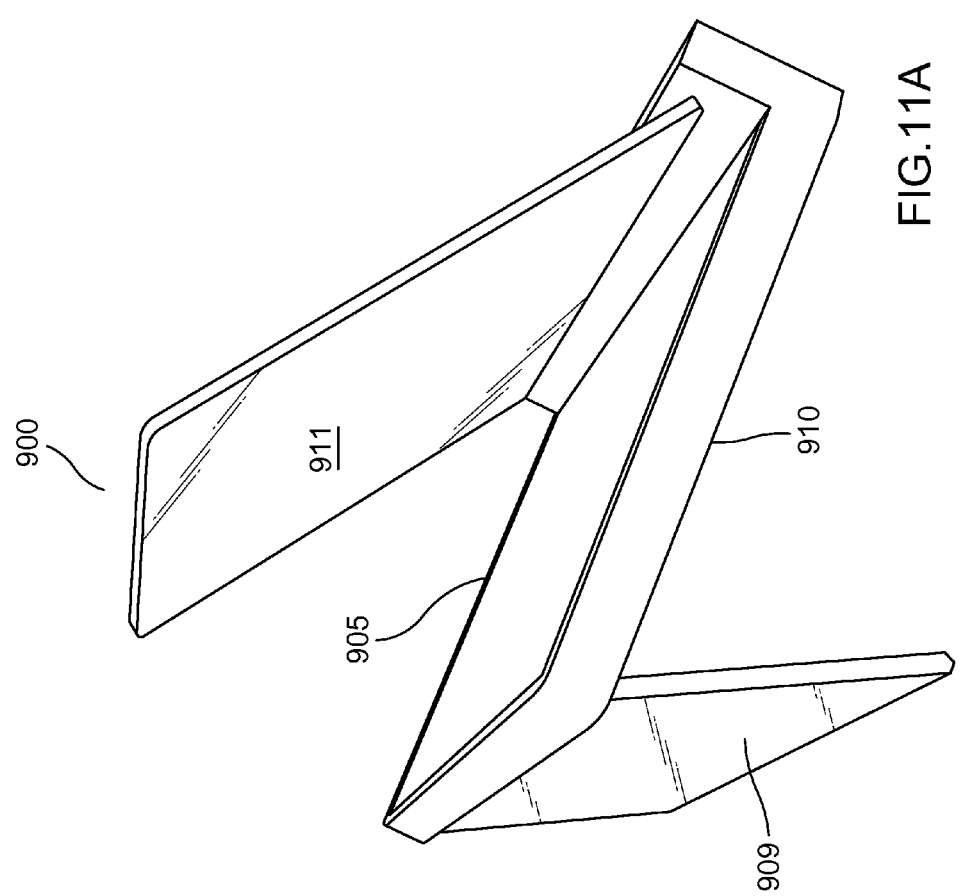

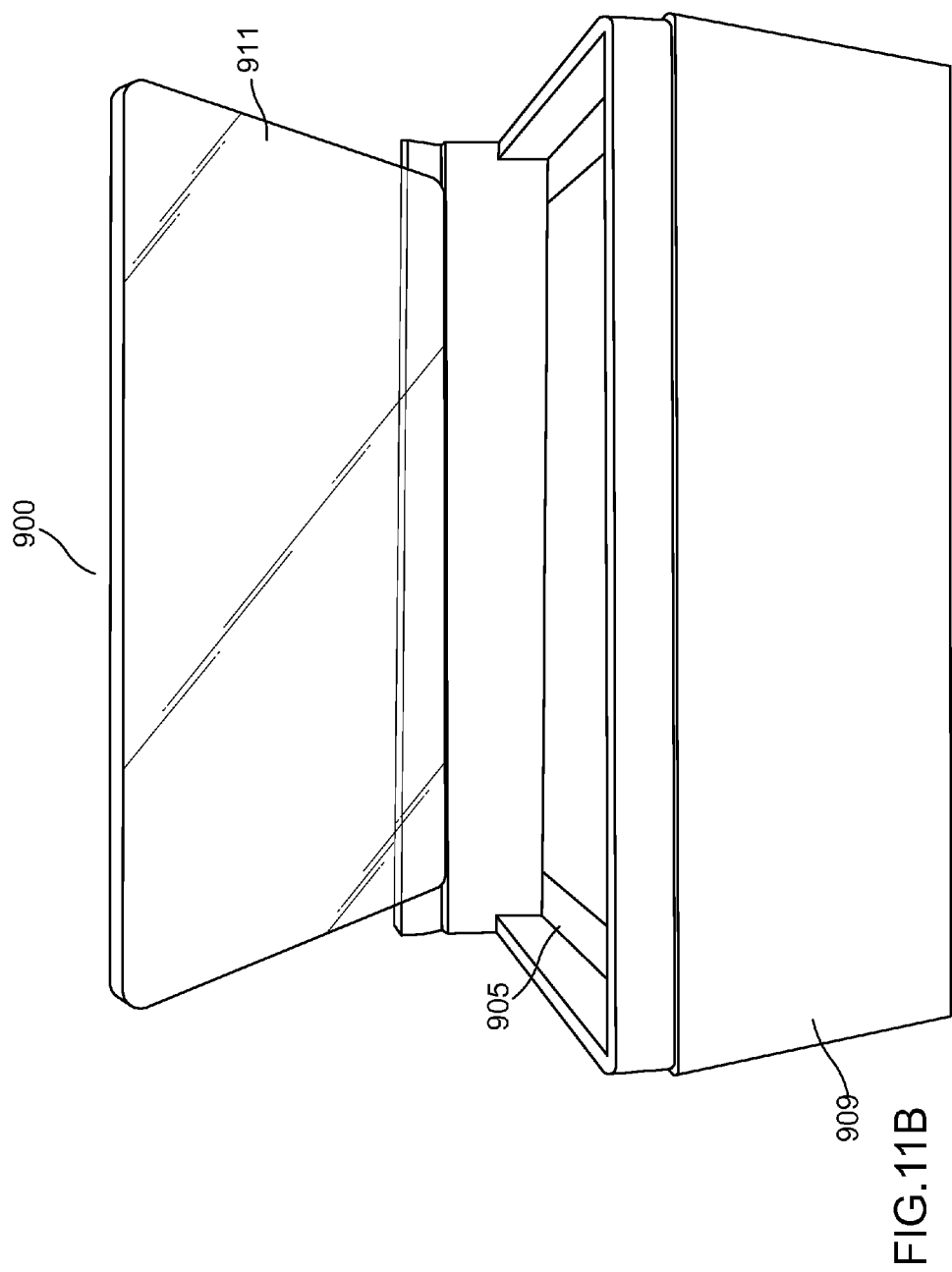

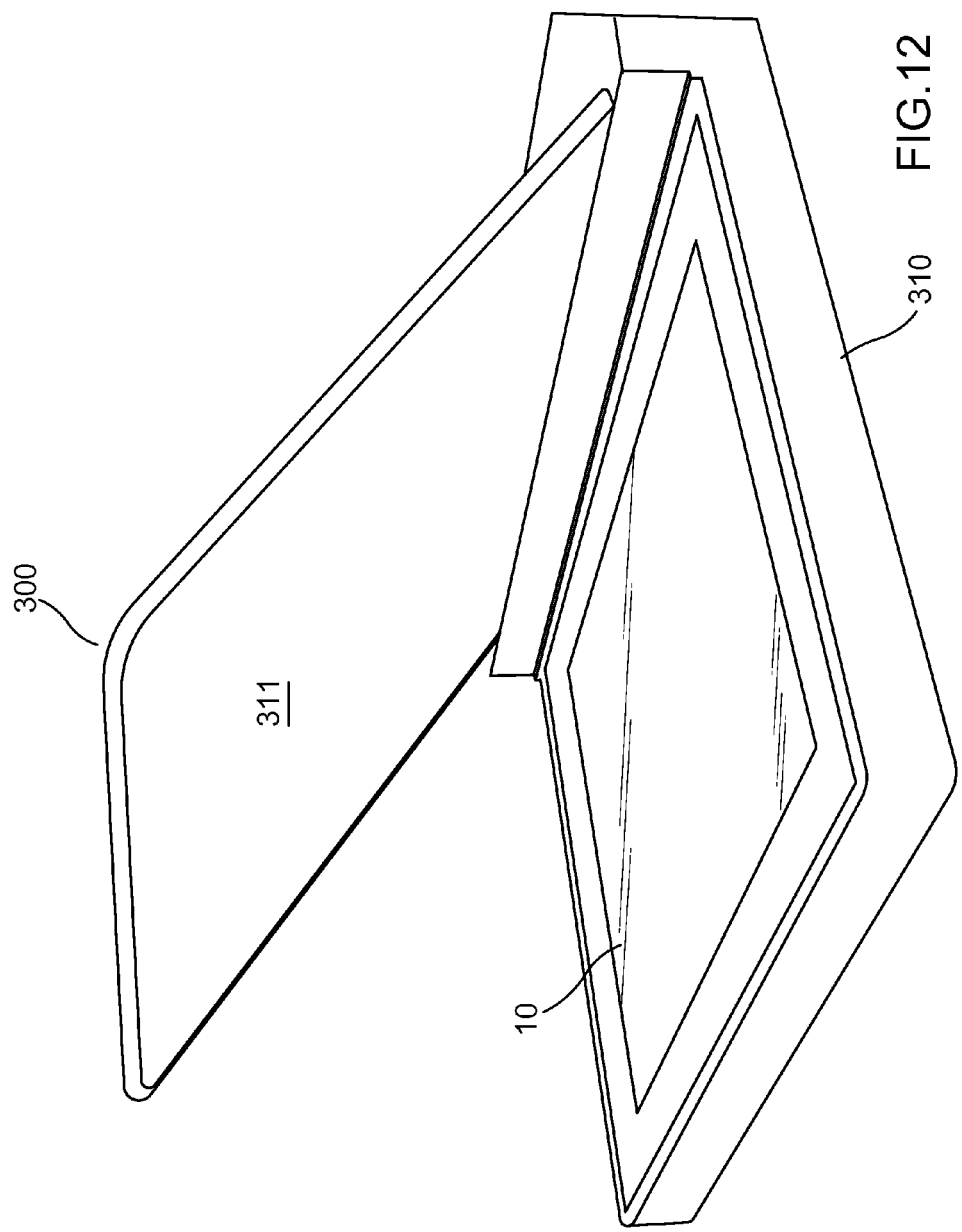

ACCESSORY FOR REFLECTING AN IMAGE FROM A DISPLAY SCREEN OF A PORTABLE ELECTRONIC DEVICE

CROSS-REFERENCE TO RELATED APPLICATION

This application claims the benefit of U.S. Provisional Patent Application Ser. No. 61/489,216, filed May 23, 2011, the contents of which are incorporated by reference.

FIELD OF THE INVENTION

The invention generally relates to accessories for portable electronic devices that offer a screen for displaying the contents of a display of an electronic device.

BACKGROUND

Tablet computers are very popular, offering a comfortable middle-ground between smartphones and laptops. Tablets have larger displays than smartphones and provide improved portability over laptops, potentially offering users rich experiences. People use tablets to read, watch movies, play games, and view web pages.

A variety of accessories are available for tablets. For example, some covers are designed to double as a protective cover and support stand. Such covers can be folded into make-shift easels for holding up a tablet so that a user does not have to crane their neck uncomfortably while watching a movie. However, this arrangement lifts the mass of the tablet into the air in an unstable arrangement in which the tablet is susceptible to being knocked down and in which a charging cord can protrude outwards and upwards.

SUMMARY

The invention provides, for an electronic device, an accessory that includes a reflective screen to re-display the device display. The accessory can provide a light-weight, upright display that is comfortable to view while allowing the electronic device to lay flat, for example, on a lap or desk. By incorporating a reflective or partially reflective material, a screen of the accessory can be positioned above the electronic device to create hologram-effect in which the contents of the device display is visible above the electronic device. The accessory can be used to provide a stable and comfortable set up for watching movies, reading, or viewing web pages. A device of the invention can further provide a uniquely attractive display of digital content, for example, for retail merchandising or museum information signs. The invention provides display accessories for use with a variety of different electronic device types such as, for example, tablet computers and smart phones.

Accessories of the invention can further provide durable, protective covers for electronic devices. For example, an accessory can include a leather, leather-like, or other material "book cover" form factor that folds around a tablet computer to protect it while being carried in a bag or purse.

In certain aspects, the invention provides an accessory for a portable electronic device that includes a spine coupled to at least a first leaf and sized to hold a portable electronic device. In the spine or at one edge of the leaf is a hinge coupled to a screen such that the screen can pivot towards and away from the leaf or the device. The screen can be reflective, or it can be partially reflective and partially transmissive. The accessory can provide a protective cover for the device. For example, it can include a second leaf so that the two leaves fold around the spine.

The accessory includes a mechanism to prop the screen up, relative to the display of the electronic device. For example, the screen can be held at a 45° angle (approximately or precisely, depending on use demands, commercial applications, or manufacturing tolerances), allowing a person to see the contents of the display as reflected by the screen.

The reflective display creates a hologram-like effect in that the contents of the display (e.g., a movie, web page, photo slide show) appears in the space above the device while the device, for example, lies flat on a surface. The screen can be held up by a stiff hinge (e.g., with one plastic member exerting pressure on one another), a strut, or a side wall.

The leaf can serve as a backing for the electronic device. In certain embodiments, the leaf includes a fastening mechanism—such as a plastic tab, open-front pocket, or an elastic band member—to hold the device securely in place. One or a plurality of such mechanisms may be included. Where a tab is provided, it may include a protrusion dimensioned to correspond to a feature of the electronic device.

The screen generally comprises a material (e.g., glass, plastic, fabric, foil, acrylic) that is at least partially reflective. In certain embodiments, the screen operates as a beam splitter.

The leaf part of the accessory can provide a functional or attractive cover for the device. For example, the closed accessory can take on a book-like form shape. The cover of the accessory can include any suitable material, such as, for example, leather, plastic, vinyl, fabric, latex, rubber, and silicone. In certain embodiments, the end edges of the cover include gussets (e.g., fabric or a synthetic material) to present to a viewer an enclosure that occludes light.

In certain aspects, the invention provides a reflective screen for use with a computing device that has a reflective material and a mechanism to hold the screen above a horizontal surface at an angle. The screen can be dimensioned to correspond to a size of a display of a computing device. The screen can include an anti-reflective coating. In certain embodiments, the screen is fully reflective or only partly reflective. By reflecting light emitted from a display of electronic device, the screen operates for a user as a hologram projector, allowing a user to view material displayed by an electronic device without having to hold the device up or prop the device up on an unsteady "house of cards" folding contraption.

In certain aspects, the invention provides a hologram projector that uses a screen to display a hologram that is supported by a structure configured to position the screen near a display of an electronic device. The screen can be dimensioned to correspond to the display of the electronic device. For example, the screen can have substantially the same length and width of a length and width of the device display (e.g., for compact storage). In certain embodiments, a width of the screen is equal to a length of a hypotenuse of an isosceles triangle in which two edges are the length of a width of the device display. The screen can be attached to a base, for example, via a hinge, so that it may be pivoted up into position. The screen can further include a protective cover that can be folded to substantially cover the screen and the electronic device.

In certain embodiments, a display accessory of the invention displays contents from a display of an electronic device at a different dimension from the display of the electronic device. For example, by including one or more of a lens in a light path, a display image can be magnified. By the use of lensing, the screen of the device can create a free-floating image that is larger than the image created by the electronic device. In certain embodiments, an accessory includes one or more of Fresnel less or other lens.

The supporting structure can be a frame (e.g., plastic or metal), one or a pair of sidewalls, a strut, folding mobile stand, or a customized form factor (e.g., of injection molded plastic). Preferably, the support structure can position the screen at an angle to the device display, for example, between about 35 and about 50 degrees. In certain embodiments, the screen is positioned at an angle of about 45 degrees to the device display. In some embodiments, the angle is user-adjustable (e.g., for comfort). The projector can include a mechanism for securing the electronic device and the screen to one another.

BRIEF DESCRIPTION OF THE DRAWINGS

FIG. 11A is a side view of a device according to certain embodiments of the invention.

FIG. 11B gives a back view of the device shown in FIG. 11A.

FIG. 12 gives a front perspective view of a projector accessory.

DETAILED DESCRIPTION

Figure 1:
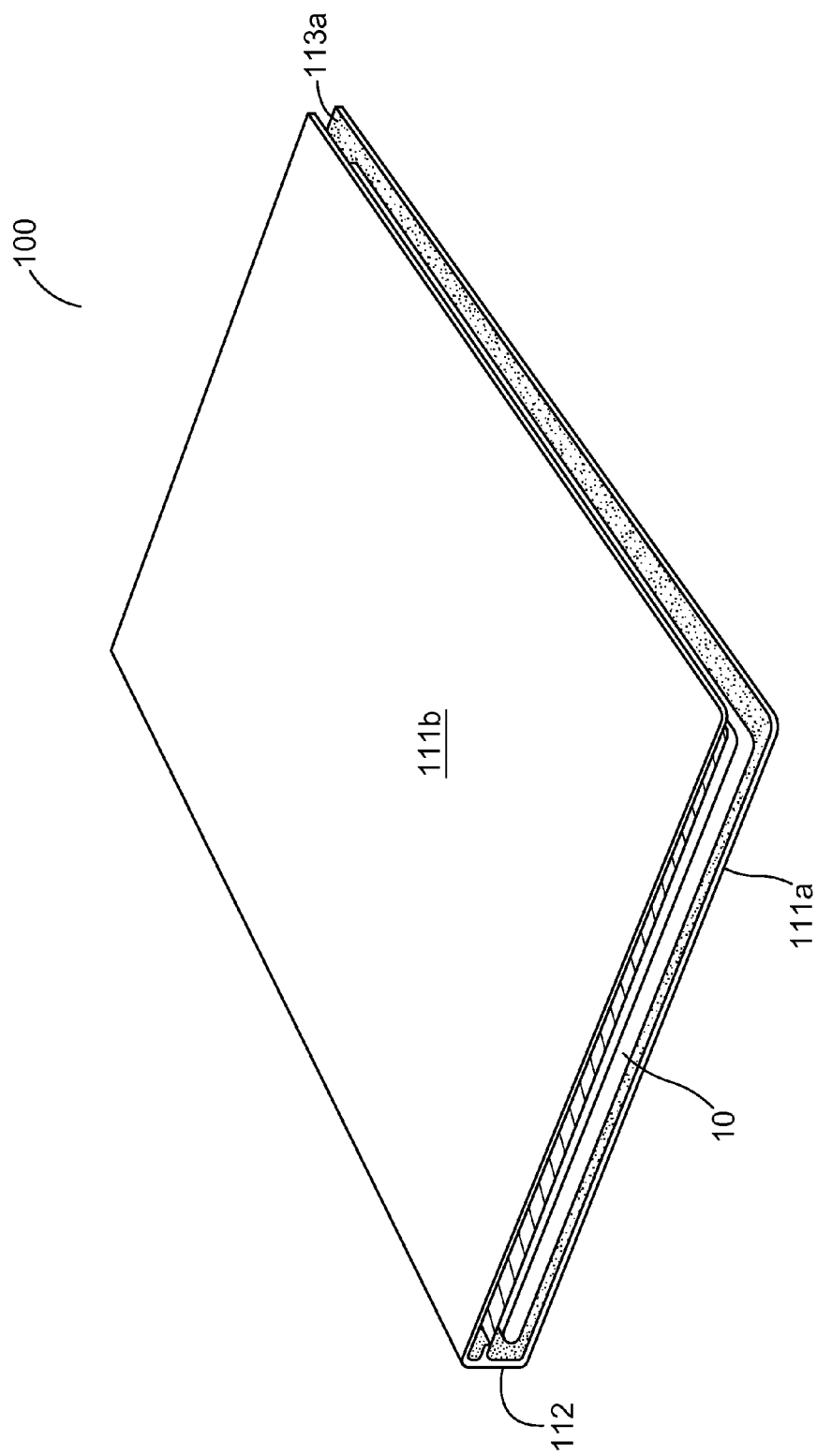
FIG. 1 is a depiction of a screen in a cover for a portable electronic device shown in a closed position.

Embodiments of the invention are discussed below with reference to FIGS. 1-7. In the drawings, like structures are referred to by like numerals throughout the several views. Note that the illustrations in the figures are representative only, and are not drawn to scale, the emphasis having instead been generally placed upon illustrating the principles of the invention and the disclosed embodiments. However, those skilled in the art will readily appreciate that the detailed description given herein with respect to these figures is for explanatory purposes as the invention extends beyond these limited embodiments.

In certain aspects, the present invention provides a cover for a portable electronic device. The cover includes a reflective or partially reflective screen for projecting virtual (e.g., free-floating) images from the display screen of portable electronic devices. The use of a partially reflective screen can increase the degree of light reflected from the screen and can increase the user's perceived strength of the virtual image. Advantageously, the cover of the invention can not only provide a covering that is protective, ornamental, or both for the portable electronic device, and that can also augment the user's viewing experience. The invention is particularly well suited for portable, battery-powered electronic devices, and more particularly, handheld battery-powered electronic devices, such as tablet computers (PC, mac, linux, etc.), portable media players, smart phones, tablet-smartphone hybrids (e.g., Samsung Galaxy Note, Asus Padfone) and portable game players.

Figure 2:
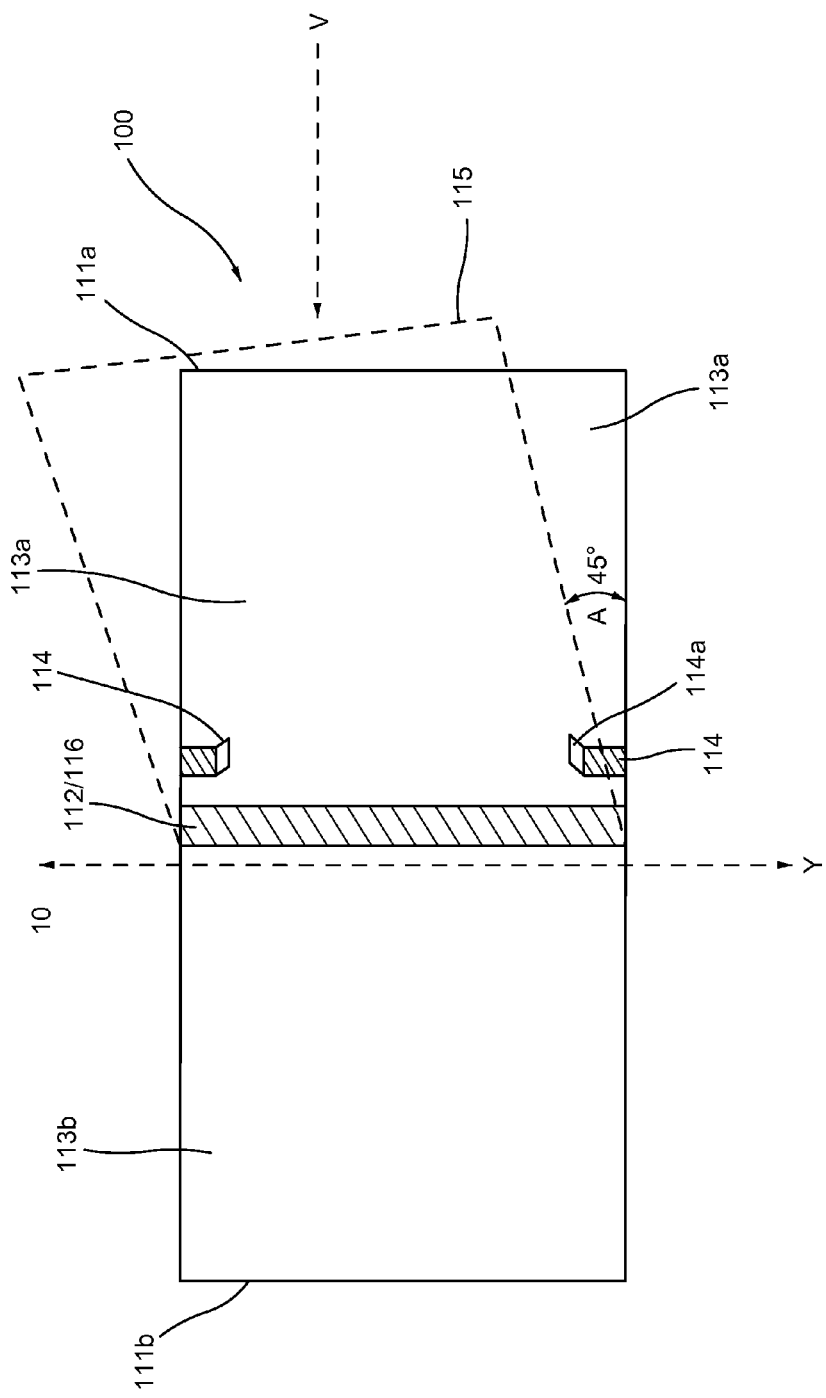
FIG. 2 is a depiction of the cover shown in FIG. 1 in an open position.
Figure 3:
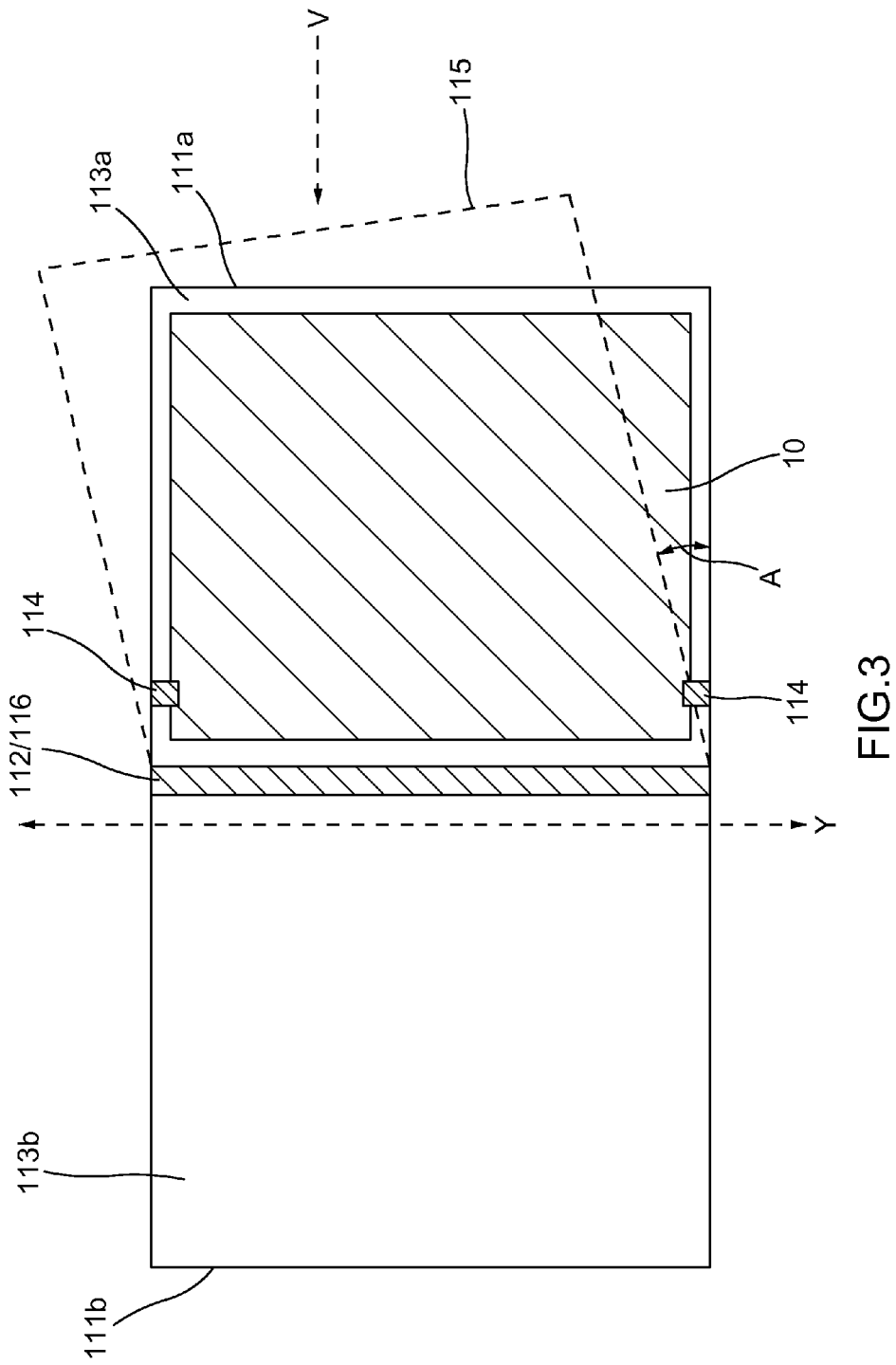
FIG. 3 is a depiction of the cover shown in FIG. 2 in an open position.

FIGS. 1-3 depict simplified diagrams of a cover 100 for a portable electronic device 10 that includes a reflective or partially reflective screen for projecting content displayed on the display screen of the portable electronic device 10, in accordance with one embodiment of the present invention. The cover 100 includes first leaf 111a, optional second leaf 111b, and a spine 112 disposed in between the two leafs, each of the leafs and spine having an exterior surface and an interior surface. The cover 100 is configured to wrap around the exterior surfaces of the portable electronic device 10 like a book cover, as shown in FIG. 1.

The interior surface of the cover 100 includes two inner faces, 113a (the inner face of first leaf 111a) and 113b (the inner face of second leaf 111b), disposed on opposite sides of the spine 112.

The inner face 113a of first leaf 111a may include one or more tabs 114 disposed on an outer edge of the inner face 113a. In certain embodiments, the one or more tabs 114 each contain at least one protrusion 114a that secure an electronic device in place. In certain embodiments, a protrusion 114a is included that aligns and mates with one or more features (e.g., indentations or impressions) disposed on an outer edge of the portable electronic device 10, such that portable electronic device 10 can be snapped or locked into place and held securely against the inner face 113a of the cover 100 by the one or more tabs 114. In some embodiments, a protrusion 114a on a tab 114 having a plastic quality snaps over the edge of a device onto a top surface, to hold the device in place. Protrusion 114a can be provided that is spaced apart from inner face 113b by a distance that represents a common, or standard, thickness of an electronic device (e.g., the thickness of the tablet computer sold under the trademark IPAD by Apple (Cupertino, Calif.)).

The cover 100 further includes a reflective or partially reflective screen 115 having an edge coupled to the interior surface of the spine 112. In certain embodiments, the reflective or partially reflective screen is coupled to the interior surface of the spine 112 by a hinge 116 that extends along the longitudinal axis Y of the spine 112, to allow the screen 115 to independently pivot relative to first leaf 111a, as shown in FIG. 2. Preferably, the hinge 116 contains a stop position that allows the screen to be pivoted only between a 0° and 45° angle relative to inner face 113a of first leaf 111a. For example, the reflective or partially reflective screen 115 may be held at the 45° angle by tension or friction or by one or more detents within the hinge 116 that stops rotation beyond the 45° angle.

FIG. 3 shows cover 100 in an open position with device 10 disposed therein. Screen 115 is angled above the display of device 10. The display of device 10 is generally a screen, such as a glass or similar touch screen (e.g., a capacitance touch screen). Device 10 may generally have a rectangular display. Regardless of a geometric shape of a display of device 10, the display can be described in terms of a maximum length LD parallel to axis Y of spine 112 and a maximum width WD perpendicular to axis Y of spine 112. In certain embodiments, WD and LD are associated with an intended specific model of device 10, a class of electronic devices, or a predominant industry standard tablet display size. Similarly, screen 115 can be described in terms of a predominant length L parallel to axis Y of spine 112 and a predominant width W perpendicular to axis Y of spine 112. Screen 115 can have any suitable predominant width W, such as a predominant width W that is approximately equal to WD or that is larger than WD. In certain embodiments, W is approximately equal to $\sqrt{(2WD^2)}$ (e.g., within about 1 or 2 cm).

As shown in FIG. 3, first leaf 111a and optional second leaf 111b of cover 100 can be laid flat on a surface (e.g., as an open book could be laid flat) to use screen 115. In use (i.e., when the portable electronic device is snapped/locked into tab(s) 114), the cover 100 with the device 10 disposed therein is laid on top of a flat surface. The leaf 111b is fully opened until it lays flat. The reflective or partially reflective screen 115 is then pivoted on the hinge until it reaches the stop position (i.e., the approximate 45° angle relative to the inner face 113a of leaf 111a). In other words, the screen 115 is inclined at approximately 45° to the plane of emission of light from the display screen of the portable electronic device 10.

Light emitted by the display of device 10 is reflected off of screen 115 such that the content of the display of device 10 appears to a spectator as if it were floating above device 10 (i.e., as a hologram), behind screen 115 or in front of screen 115. While the holographic image can be perceived by a viewer/spectator from any distance from the device, the viewing angle of the holographic image is between 110 to 170 degrees, preferably 115 to 160 degrees, even more preferably 120 to 150 degrees from a single point in the center of the screen 115 (or any specific value within said ranges). In certain embodiments, the size of the hologram is confined to the boundaries defining the display screen of the portable electronic device 10.

In some embodiments, a device of the invention includes one or more lenses (e.g., glass, acrylic, or similar) arrayed to re-dimension a holographic image, display, or hologram. Lensing can be provided to resize a display of device 10. For example, a smartphone or tablet-smartphone hybrid can be provided with a cover 100 (e.g., a cover having a size to substantially correspond to device 10) that includes lenses to create a larger display for more enjoyable viewing. This can provide, for example, the experience of watching a movie or browsing the web in a full-sized view based on use of a smartphone or small tablet-sized device sitting on a surface in front of a user.

In certain embodiments, the reflective or partially reflective screen 115 contains an anti-reflective coating to produce a high degree of reflectivity on the side of screen 115 facing the display screen of the device 10, and a high degree of translucency on the opposite side of the screen 115. Such setup will prevent ghosting of the reflected image. In the embodiments, where an anti-reflective coating is used on the display surface, the holographic image is only perceived from the front (i.e., viewed into angle A) of the screen 115 when set up over the display screen of the portable electronic device 10. Where no anti-reflective coating is used, the holographic image is perceived from both the front side and the back side of the set-up. If the screen 115 is positioned at an angle less than or greater than 45° relative to the display screen of the portable electronic device 10, the spectator or viewer V does not perceive any holographic image, and instead sees through the reflective or partially reflective screen 115, from both the front and back of the set-up, regardless of whether an anti-reflective coating is used.

When not in use, the reflective or partially reflective screen 115 is pivoted back to 0° relative to the inner face 113a of leaf 111a such that it lays flat against the display screen of device 10. Leaf 111b is then folded over reflective screen 115 to protect the reflective screen 115 and the device 10 during transport.

The reflective or partially reflective screen 115 can be a beamsplitter. As used herein, a beam splitter device refers to an optical device used to split incident light entering it by allowing approximately half of the light to transmit and continue along the originating path while reflecting the remaining light along a separate path. In this way the beam splitter provides two identical beams or images at about half the strength of the incident light. Examples of beam splitter devices include, without limitation, dielectric mirrors, dichroic mirrors, interferometers, teleprompter mirrors, half-silvered mirrors, and beam splitter cubes.

The reflective or partially reflective screen 115 can be glass, acrylic, mesh, fabric, or similar. Screen 115 can include a multi-layer (e.g., laminated) material such as one similar to materials described in U.S. Pat. No. 5,822,124, the contents of which are hereby incorporated by reference in their entirety. In certain embodiments, mirrored glass or metal is used. Alternatively, a mesh or fabric suspended or stretched across a frame is employed. Materials for screens including beam splitter screens are discussed in U.S. Pat. No. 5,771,124; U.S. Pat. No. 5,572,229; U.S. Pub. 2009/0256970; and U.S. Pub. 2002/0075461, the contents of each of which are hereby incorporated by reference in their entirety for all purposes. A variety of optically transparent materials may be used in beam splitting screen including, for example, any of a variety of glass, molded plastic, polymer, acrylic resin, or acrylic materials (such as polymethyl methacrylate, polystyrene, polycarbonate, methyl methacrylate styrene, styrene acrylonitrile, and acrylonitrile butadiene styrene). In certain embodiments, a screen of the invention includes an acrylic polymer such as one sold under the trademark PLEXIGLAS by Altugas International (Bristol, Pa.). In one embodiment, the optically transparent material has refractive index of at least about 1.3. Material for screen 115 can act as both a reflective and transmissive optical element. In one embodiment, screen 115 has a coating with a broader bandwidth than the illumination source. Types of coatings which may be used with this type of beam splitter include, for example, dielectric, metal/dielectric and metal coatings. Hybrid metal/dielectric coatings can provide moderate light absorption with little polarization sensitivity. These coatings also show relative insensitivity to the angle of incidence.

In certain embodiments, screen 115 includes an element sandwiched between two optically transparent materials which each have an index of refraction greater than air. In various embodiments, optically transparent material can be adapted to be coated with one of a variety of optical coatings. A thin coating can be prepared, for example, by vapor deposition technologies (e.g., plasma vapor deposition, carbon vapor deposition). In some embodiments, one optically transparent material may be a glass slide which is glued to one or more surfaces of another optically transparent material. A beam splitter may be incorporated into either optically transparent material. In certain embodiments, screen 115 includes an optional Fresnel lens.

The cover 100 can be made from a variety of materials, including without limitation, latex, rubber, silicone, vinyl, leather, plastic, or a fabric. In certain embodiments, the cover 100 may further include a strap, such as Velcro strap or a strap with a button attachment for securing first leaf 111a and optional second leaf 111b in the closed position during transport. The cover 100 (including the reflective screen 115) can be dimensioned to fit any portable electronic device having a display screen. A portable electronic device for use with the invention can be any known in the art such as, for example, a tablet computer, smartphone, tablet-smartphone hybrid, digital picture frame, and media and game player. Examples include, for example, the Quaduro Systems QuadPad 3G Plus, the bModol2, the Neofonie WeTab, the Samsung Galaxy Note, the Asus Padfone, the Dixons Retail pic Advent Vega, the Dell Inspiron Duo A flip screen Netbook and Tablet PC hybrid, the HP Slate 500, the HP Touchsmart tm2t, the MotoroIIa Xoom, the ViewSonic ViewPad, the Acer TravelMate C300, Ratent 15" digital photo frame, ViewSonic VFM1536-11 digital picture frame, the Sungale CA700 Digital Photo Frame, the LG G-Slate, the RIM Blackberry PlayBook, the Apple iPad, the Apple iPad 2, the Asus EEE Pad MeMo, the Asus EEE Slate EP121, the Asus EEE Transformer, the Asus EEE Pad Slicer, the Dell Streak 7, the Fujitsu LifeBook T580 or T5010, the ZTE V11, the Toshiba Tablet, the Samsung Galaxy Tab 10.1 and 8.9, and the Sony Honeycomb Android Tablet S2; portable media players such as, for example, the HP DreamScreen 100 and 130, the Cowon A2 or A3, the Cowon 02, the Cowon Q5W, the Cowon V5, the iRiver Spin, the iRiver Clix, the Archos 604 WiFi, the Archos 605 WiFi, the Archos 7, the Archos 705 WiFi, the Archos AV700 Mobile DVR, the MobiBlu T10, the Blue Raven MediaMate 7040, the Blue Raven MediaMate 7080, the Coby PMP-7040, the Aluratek CINEPAL APMP100F, the Aluratek CINEPAL APMP101F, the AIPTEK Portable 3D Display, the Nextar MC3007, and the SVAT PMP-7301; and portable game players.

The cover 100 may be configured to cover a portion of one or more external surfaces of the portable electronic device 10 and may provide ornamentation, protection, or both.

Additionally or alternatively, the cover 100 may provide ornamentation to the portable electronic device (i.e., it may help define the overall ornamental appearance of the electronic device). The cover 100 can also permit personalized ornamentation. The cover 100 may also provide tactility in order to improve the feel and grip to the portable electronic device.

Figure 4:
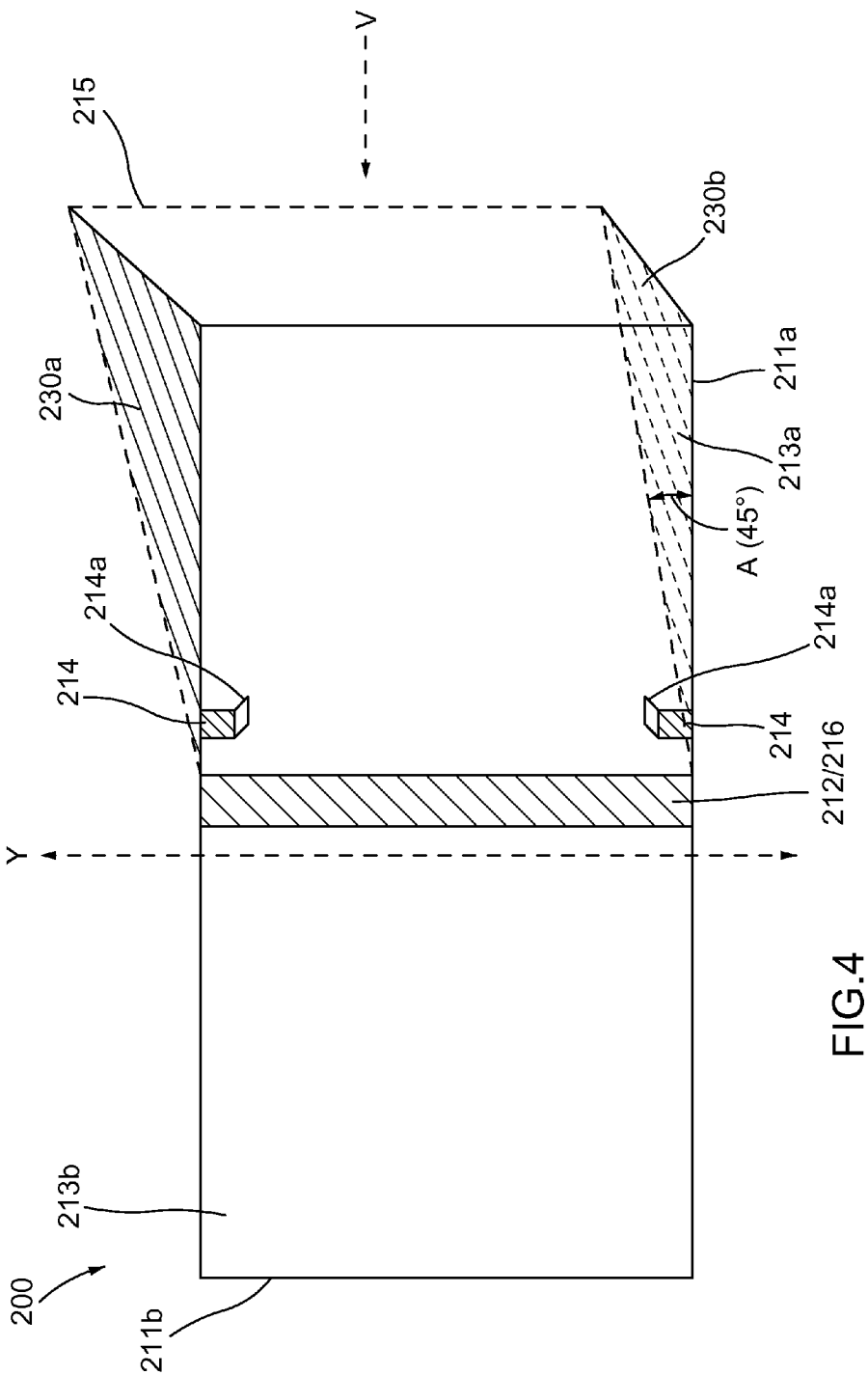
FIG. 4 depicts an alternative embodiment of a cover with a screen.
Figure 5:
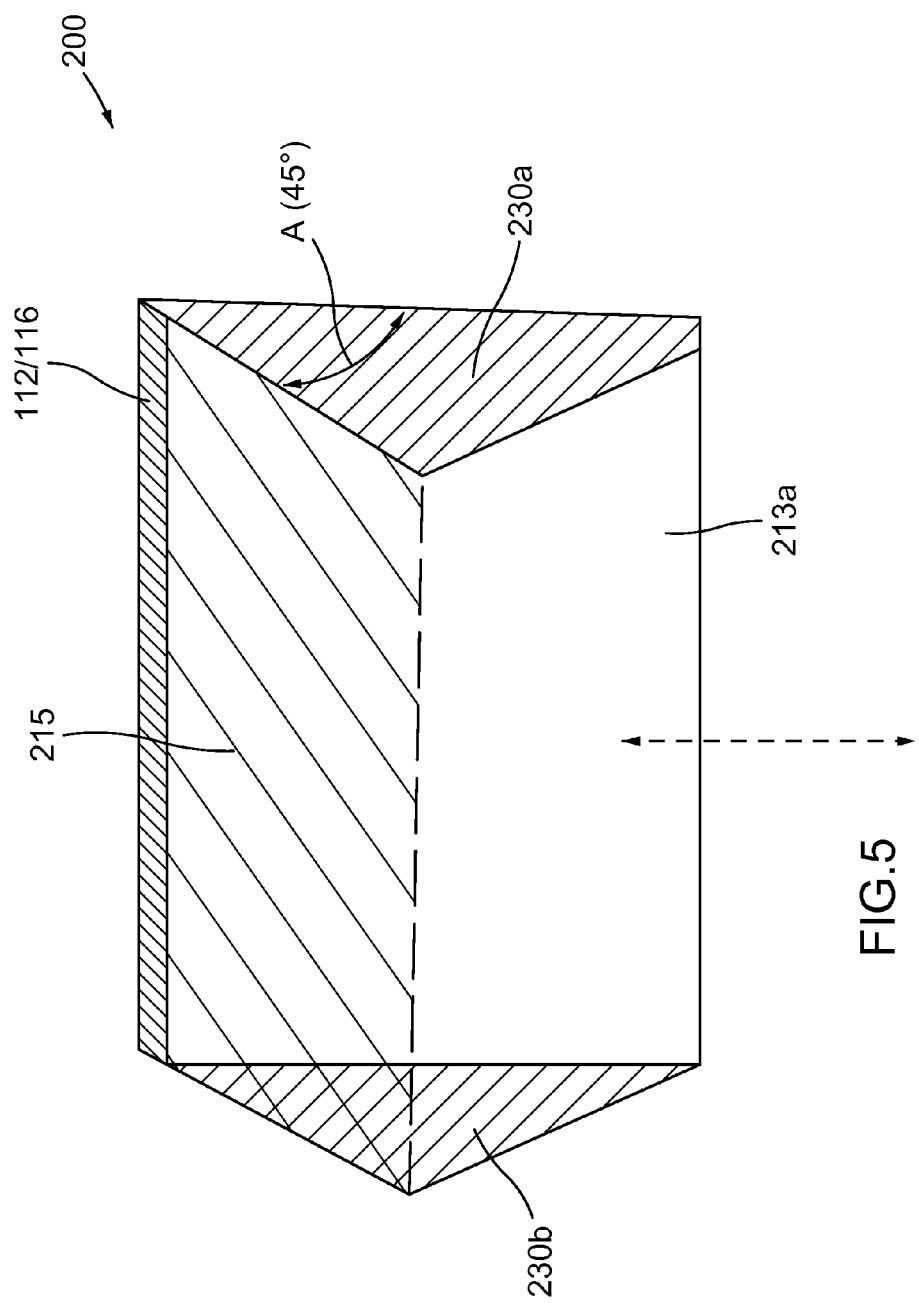
FIG. 5 depicts a front view of the open cover depicted in FIG. 4.

FIGS. 4-5 depict simplified diagrams of a cover 200 for a portable electronic device 10 that includes a reflective or partially reflective screen for projecting content displayed on the display screen of the portable electronic device 10, in accordance with another embodiment of the present invention. The cover 200 includes first leaf 211a and optional second leaf 211b and a spine 212 disposed in between the two leafs, each of the leafs and spine having an exterior surface and an interior surface. The cover 200 is configured to wrap around the exterior surfaces of the portable electronic device 10 like a book cover. The interior surface of the cover 200, which includes two inner faces, 213a (the inner face of leaf 211a) and 213b (the inner face of optional second leaf 211b), disposed on opposite sides of the spine 212.

The inner face 213a of first leaf 211a may include one or more tabs 214 disposed on an outer edge of the inner face 213a. In certain embodiments, the one or more tabs 214 each contain at least one protrusion 214a to fasten a device in place. For example, a protrusion can be designed that aligns and mates with one or more features disposed on an outer edge of the portable electronic device 10, such that portable electronic device 10 can be snapped or locked into place and held securely against the inner face 213a of the cover 200 by the one or more tabs 214.

In certain embodiments, cover 200 includes two sidewalls 230a and 230b coupled to opposite sides of leaf 211a for reducing the amount of ambient light that the device display is exposed to when cover 200 is in use. Sidewalls can function to occlude light and not be structural (i.e., a strut or hinge-and-detent mechanism support screen 215). Or the sidewalls can do double duty as light-blocking and structural. For example, in some embodiments, sidewalls 230a and 230b are substantially rigid and configured to be collapsible such that the sidewalls can be laid flat against the display screen of the portable electronic device 10, or against inner face 213a of leaf 211a when the cover 200 is not in use. Sidewalls 230a and 230b are dimensioned to prop reflective screen 215 up at a 45° angle relative to the display screen of electronic device 10 when the cover 200 is in use, or relative to inner face 213a of leaf 211a when the cover 200 is not in use. Preferably, the sidewalls 230a and 230b are comprised of a material that does not allow light to be transmitted therethrough.

In use, the sidewalls are raised until the sidewalls 230a and 230b are substantially perpendicular to leaf 211a. For example, each of the sidewalls can be coupled to opposite sides of leaf 211a via a flexible spine or via hinges that extend along opposite sides of leaf 211a. Where hinges are used, the hinges preferably contain a stop position that allows the sidewalls 230a and 230b to be pivoted in opposite directions relative to each other and between a 0° and 90° angle relative to leaf 211a. The sidewalls 230a and 230b can be held at the 90° angle by tension or friction within the respective hinges or by one or more detents within the hinges that stops rotation beyond the 90° angle. Sidewalls 230a and 230b can include a rigid, semi-rigid, or flexible material. For example, each can include a triangle of material such as plastic or reinforced leather or other soft material and be fixed to the edges of leaf 211a. In certain embodiments, each sidewall includes an accordion-fold or gusset structure. A sidewall can include a synthetic material such as, for example, a high-density polyethylene fiber such as that sold under the trademark TYVEK by E.I. du Pont de Nemours and Company (Wilmington, Del.).

The cover 200 further includes a reflective or partially reflective screen 215 coupled to the interior surface of the spine 212. The reflective or partially reflective screen is coupled to the interior surface of the spine 212 by a hinge 216 that extends along the longitudinal axis Y of the spine 212, to allow the screen 215 to independently pivot relative to leaf 211a. In certain embodiments, the screen 215 freely pivots about hinge 216 relative to inner face 213a of leaf 211a. In other certain embodiments, the hinge 216 may contain a stop position that allows the screen 215 to be pivoted only between a 0 0 and 45° angle relative to inner face 213b of leaf 211a. In certain embodiments, the reflective or partially reflective screen 215 is held at the 45° angle by tension or friction or by one or more detents within the hinge 212 that stops rotation beyond the 45° angle.

When not in use, the cover 200 and its components (i.e., the reflective screen 215 and sidewalls 230a and 230b) are completely collapsed such that the cover is substantially flat within a horizontal plane, with optional second leaf 211b on top of leaf 211a, and sidewalls 230a and 230b and reflective screen 215 disposed between leafs 211a and 211b.

For use, the collapsed cover 200 is first laid on top of a flat surface. Leaf 211b is opened away from leaf 211a such that it lays flat against the surface and adjacent to leaf 211a and the inner faces 213a and 213b are facing upwards. The reflective or partially reflective screen 215 is then raised to an angle above inner face 213a of first leaf 211a. In structural sidewall embodiments, the sidewalls 230a and 230b are raised in opposite directions from each other until each sidewall is perpendicular to leaf 211a. In certain embodiments, the screen 215 is lowered onto and supported by the perpendicularly disposed sidewalls 230a and 230b, thereby creating a partially enclosed structure over leaf 211a to reduce the amount of ambient light that the display screen of portable electronic device 10 is exposed to when disposed therein during use of cover 200. In certain embodiments, a strut is lifted and positioned to hold screen 215 in an angled-up position. In some embodiments, sidewalls expand to form a light box (e.g., where sidewalls comprise TYVEK gussets).

When supported by a mechanism such as the sidewalls or a strut, the screen 215 is inclined at approximately 45° to the plane of emission of light from the display screen of the portable electronic device 10 when the cover 200 is in use. The light from the display screen is reflected off of the reflective or partially reflective screen 215 such that a virtual image of the content being displayed on the display screen of the portable electronic device 10 appears to a spectator as if it is floating or hovering above the portable electronic device 10 (i.e., as a hologram), behind screen 215 or in front of screen 215.

While the holographic image can be perceived by a viewer from any distance from the device, the viewing angle of the holographic image is between 110 to 170 degrees, preferably 115 to 160 degrees, even more preferably 120 to 150 degrees from a single point in the center of the screen 115 (or any specific value within said ranges). In some embodiments, the size of the hologram is confined to the boundaries defining the display screen of the portable electronic device 10. In some embodiments (e.g., where lenses or curved mirrors are used), the size of the hologram can be larger than the display screen of device 10.

In certain embodiments, the reflective or partially reflective screen 215 contains an anti-reflective coating to produce a high degree of reflectivity on the side of screen 215 facing the display screen of the device 10, and a high degree of translucency on the opposite side of the screen 215. Such setup will prevent ghosting of the reflected image. In the embodiments, where an anti-reflective coating is used on the display surface, the holographic image is only perceived from the front (i.e., viewed into angle A) of the screen 215 when set up over the display screen of the portable electronic device 10. Where no anti-reflective coating is used, the holographic image is perceived from both the front side and the back side of the set-up. If the screen 215 is positioned at an angle less than or greater than 45° relative to the display screen of the portable electronic device 10, the spectator or viewer V does not perceive any holographic image, and instead sees through the reflective or partially reflective screen 115, from both the front and back of the set-up, regardless of whether an anti-reflective coating is used.

When not in use, the reflective or partially reflective screen 215 is pivoted back to 0° relative to the inner face 213a of first leaf 211a such that it lays flat against the display screen of device 10. Optional second leaf 211b can then be folded over reflective screen 215 to protect the reflective screen 215 and the device 10 during transport.

The reflective or partially reflective screen 215 can be a beam splitter, such as is discussed above. The cover 200 can be made from a variety of materials, such as any of those discussed elsewhere herein. The cover 200 (including the reflective screen 215) can be dimensioned to fit any portable electronic device having a display screen. Examples of portable electronic devices are given above.

The cover 200 may be configured to cover a portion of one or more external surfaces of the portable electronic device 10 and provide protection, ornamentation, or both. For example, cover 200 can also permit personalized ornamentation. The cover 200 may also provide tactility in order to improve the feel and grip to the portable electronic device.

In certain aspects, the present invention provides a projector accessory for projecting virtual images of the content displayed on the display screen of a portable electronic device.

Figure 6:
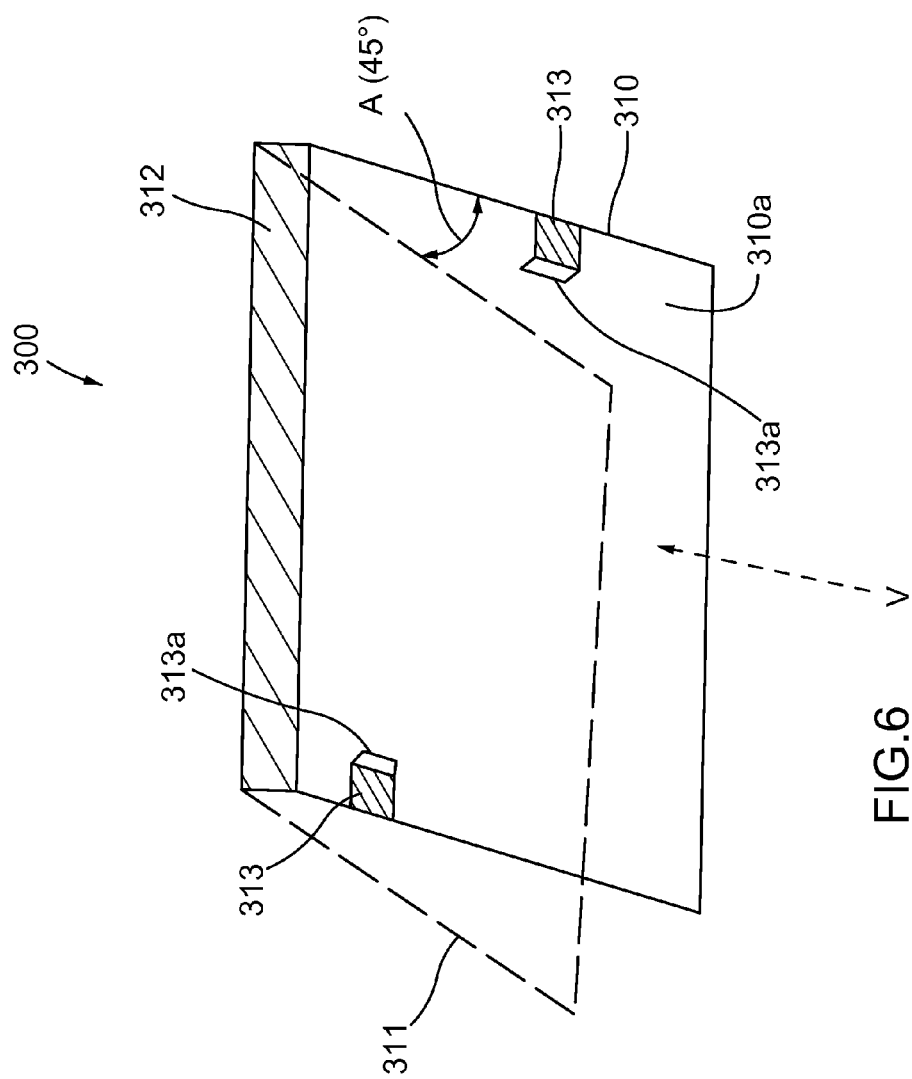
FIG. 6 depicts an exemplary embodiment of an accessory for a portable electronic device.

FIG. 6 depicts a simplified diagram of a projector accessory 300 for a portable electronic device 10, in accordance one embodiment of the invention. The projector accessory 300 includes a base 310 and a reflective or partially reflective screen 311 coupled to the base 310 via a hinge 312 that extends along the edge of one side of the base 310. The base 310 includes a top surface 310a and a bottom surface (not shown). The top surface 310a optionally includes one or more tabs 313 disposed on the outer edges. In certain embodiments, the one or more tabs 313 each contain at least one protrusion 313a that secures device 10 into accessory 300. For example, each of tab 313 can align with or mate with a corresponding feature disposed on an outer edge of device 10, such that device 10 can be snapped or locked into place and held securely against the top surface 310a of base 310 by the one or more tabs 313.

Hinge 312 is configured to allow the screen 311 to independently pivot relative to the top surface 310a of the base 310. Preferably, the hinge contains a stop position that allows the screen 311 to be pivoted only between about a 0° and about a 45° angle relative to the top surface 310a of base 310. The reflective or partially reflective screen 311 can be held at the 45° angle by tension or friction within the hinge 312 or by one or more detents within the hinge 312 that stops rotation beyond the approximately 45° angle.

When not in use, the projector assembly 300 is completely collapsed such that screen 311 lies substantially flat against base 310 within a horizontal plane. In use the collapsed assembly is first laid on a flat surface with base 310 on the bottom against the flat surface. The reflective or partially reflective screen 311 is then pivoted on the hinge until it reaches the stop position (i.e., the 45° angle relative to the top surface 310a of base 310). The portable electronic device 10 is then disposed on the top surface 310a of base 310 such that screen 311 is angled over the display screen of the device 10. In other words, the screen 311 is inclined at approximately 45° to the plane of emission of light from the display screen of the portable electronic device 10. The light from the display screen is reflected off of the reflective or partially reflective screen 311 such that a virtual image of the content being displayed on the display screen of the portable electronic device 10 appears to a spectator as if it is floating or hovering above the portable electronic device 10 (i.e., as a hologram), behind screen 311 or in front of screen 311. While the holographic image can be perceived by a viewer from any distance from the device, the viewing angle of the holographic image is between 110 to 170 degrees, preferably 115 to 160 degrees, even more preferably 120 to 150 degrees from a single point in the center of the screen 311 (or any specific value within said ranges). The size of the hologram is confined to the boundaries defining the display screen of the portable electronic device 10 or magnified through lenses or like.

In certain embodiments, the reflective or partially reflective screen 311 contains an anti-reflective coating to produce a high degree of reflectivity on the side of screen 311 facing the display screen of the device 10, and a high degree of translucency on the opposite side of the screen 311. Such setup will prevent ghosting of the reflected image reflected. In the embodiments, where an anti-reflective coating is used on the display surface, the holographic image is only perceived from the front (i.e., viewed into angle A) of the screen 311 when set up over the display screen of the portable electronic device 10. Where no anti-reflective coating is used, the holographic image is perceived from both the front side and the back side of the set-up. If the reflective or partially reflective screen 311 is positioned at an angle less than or greater than 45° relative to the display panel, the spectator or viewer V does not perceive any holographic image, and instead sees through the reflective or partially reflective screen 311, from both the front and back of the set-up, regardless of whether an anti-reflective coating is used.

When not in use, the reflective or partially reflective screen 311 is pivoted back to 0° relative to the top surface 310a of base 310 such that it lays flat against the display screen of portable electronic device 10.

In certain embodiments, the base 310 includes at two sidewalls (not shown) for reducing the amount of ambient light that the display screen of the portable electronic device is exposed to when snapped into place in base 310. The sidewalls are configured to be collapsible such that the sidewalls can be laid flat against the display screen of the portable electronic device, or the top surface when the projection assembly is not in use. In use, the sidewalls are raised until the sidewalls are substantially perpendicular to the base 310. For example, each of the sidewalls can be coupled to the base 310 via a flexible spine or via hinges that extend along opposite sides of base 310. Where hinges are used, the hinges preferably contain a stop position that allows the sidewalls to be pivoted in opposite directions relative to each other and between a 0° and 90° angle relative to the top surface 310a of base 310. The sidewalls can be held at the 90° angle by tension or friction within the respective hinges or by one or more detents within the hinges that stops rotation beyond the 90° angle. The sidewalls are dimensioned such that they do not interfere with the position of screen 311 when in use (i.e., when the screen is disposed at a 45° angle relative to base 310). Preferably, the sidewalls are comprised of a material that does not allow light to be transmitted therethrough.

In certain embodiments, the projector accessory 300 includes a removable protective sleeve (not shown) having substantially the same dimensions (i.e., length and width) of screen 311. The protective sleeve is configured to slide over and around the free side (i.e., the un-hinged side) of screen 311 such that the screen 311 is fully protected on all sides during transport.

The reflective or partially reflective screen 311 can be a beamsplitter. Screen 311 can include any material include those discussed above. In some embodiments, the reflective or partially reflective screen 311 is a foil, such as a polymeric foil, which can have a partially reflective coating upon a front face of the foil (i.e., the side facing the display screen of the portable electronic device 10). The foil screen may be rolled about a cylinder disposed adjacent to hinge 312 when not in use.

In use, the foil screen is unrolled and retained within a box frame (not shown) that is coupled to hinge 312 such that box frame can be pivoted between a 0° and 45° angle relative to the top surface 310a of base 310. In certain embodiments, the foil screen is attached to the box frame using tensioning straps and a pair of clamp jaws, as described in U.S. Pat. No. 7,883,212, the contents of which are herein incorporated by reference in its entirety. As described in U.S. Pat. No. 7,883,212, the tension straps are adjustable to allow an even tension to be applied over the whole surface of the foil screen thereby reducing, and ideally eliminating, the formation of wrinkles upon the foil screen which reduce the quality of an image projected upon the screen.

The base 310 and sidewalls (when used) can be made from a variety of materials, including without limitation, latex, rubber, silicone, vinyl, leather, plastic, or a fabric. Preferably, the base 310 and sidewalls are made of the same material. However, in certain embodiments, base 310 and sidewalls can be made of different materials.

The projector accessory 300 can be dimensioned to fit any portable electronic device having a display screen.

Figure 7:
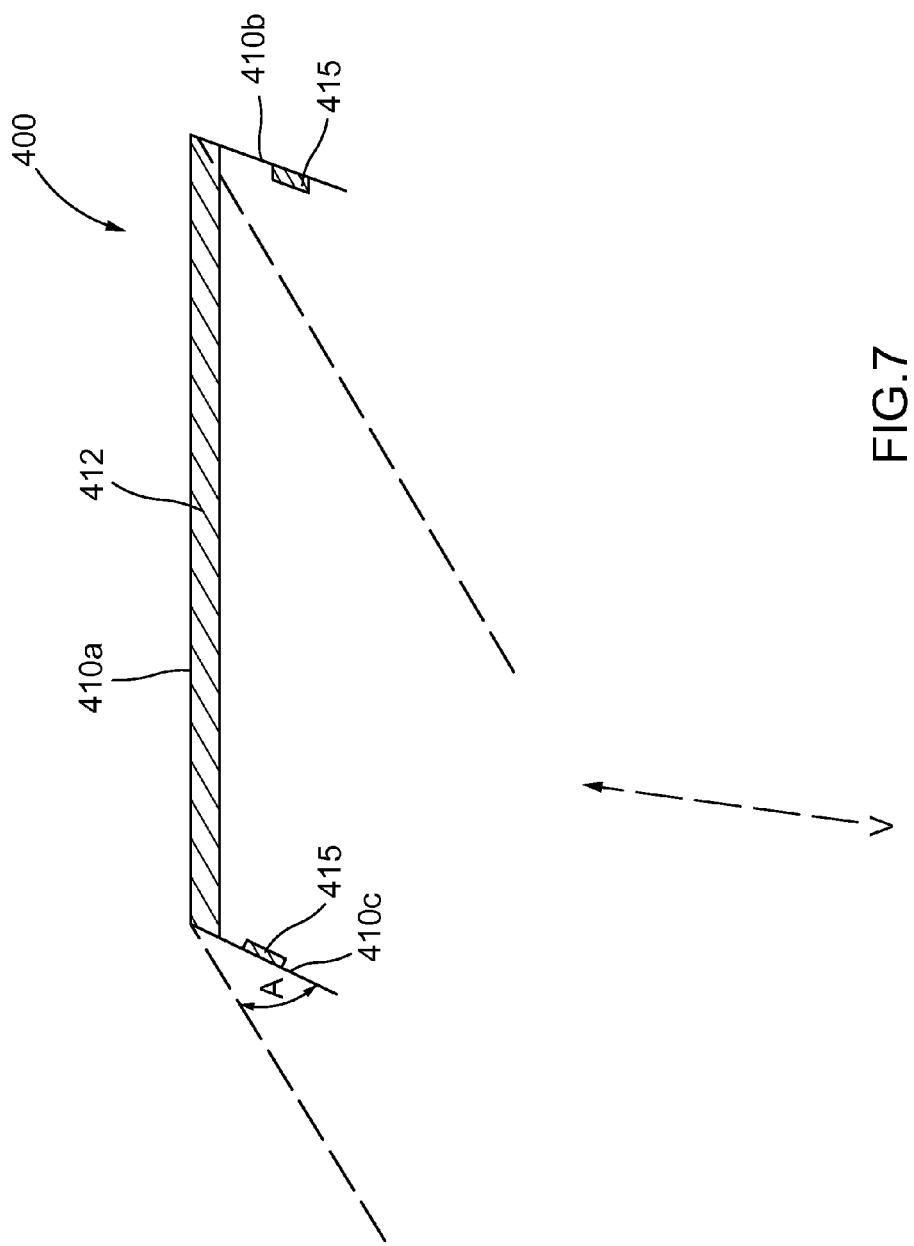
FIG. 7 depicts an alternative embodiment of an accessory for a portable electronic device.

FIG. 7 depicts a simplified diagram of a projector accessory 400 for a portable electronic device 10, in accordance with another embodiment of the invention. The projector accessory 400 includes clamp 410 that includes an elongate member 410a having first end and a second end, and a longitudinal axis extending between the first and second ends. The elongate member 410a further includes two side arms, 410b and 410c, disposed on the first and second ends of the elongate member 410a such that the side arms 410b and 410c are perpendicular to elongate member 410a. In certain embodiments, the side arms 410a and 410b each contain at least one protrusion 415 that secure device 10 in place. For example, a protrusion 415 may be provided that aligns and mates with a corresponding feature disposed on an outer edge of device 10, such that the clamp 400 can be securely attached to device 10 by snapping protrusion 415 into the corresponding feature. In other embodiments, the clamp 400 is configured to be coupled to a portable electronic device via a tension mechanism (e.g., using a screw-assembly). A reflective or partially reflective screen 411 is coupled to elongate member 410a. In certain embodiments, the reflective or partially reflective screen 411 is coupled to the elongate member 410a of clamp 400 via a hinge 412. Hinge 412 is configured to allow the screen 411 to independently pivot relative to the portable electronic device 10 when the clamp 410 is attached thereto. Preferably, the hinge contains a stop position that allows the screen 411 to be pivoted only between about a 0° and about a 45° angle relative to the display screen of the portable electronic device 10 when the clamp is attached thereto. The reflective or partially reflective screen 411 can be held at the approximately 45° angle by tension or friction within the hinge 412 or by one or more detents within the hinge 412 that stops rotation beyond the 45° angle.

In use, the portable electronic device is laid on a flat surface with the display screen facing up. The clamp 410 is attached to the portable electronic device as previously described. The reflective or partially reflective screen 411 is then pivoted on the hinge until it reaches the stop position (i.e., the 45° angle relative to the display screen of device 10). In other words, the screen 411 is inclined at approximately 45° to the plane of emission of light from the display screen of the portable electronic device 10. The light from the display screen is reflected off of the reflective or partially reflective screen 411 such that a virtual image of the content being displayed on the display screen of the portable electronic device 10 appears to a spectator as if it is floating or hovering above the portable electronic device 10 (i.e., as a hologram), behind screen 411 or in front of screen 411. While the holographic image can be perceived by a viewer/spectator from any distance from the device, the viewing angle of the holographic image is between 110 to 170 degrees, preferably 115 to 160 degrees, even more preferably 120 to 150 degrees from a single point in the center of the screen 411 (or any specific value within said ranges).

In certain embodiments, the reflective or partially reflective screen 411 contains an anti-reflective coating to produce a high degree of reflectivity on the side of screen 411 facing the display screen of the device 10, and a high degree of translucency on the opposite side of the screen 411. Such setup will prevent ghosting of the reflected image reflected. In the embodiments, where an anti-reflective coating is used on the display surface, the holographic image is only perceived from the front (i.e., viewed into angle A) of the screen 411 when set up over the display screen of the portable electronic device 10. Where no anti-reflective coating is used, the holographic image is perceived from both the front side and the back side of the set-up. If the reflective or partially reflective screen 411 is positioned at an angle less than or greater than 45° relative to the display panel, the spectator or viewer V does not perceive any holographic image, and instead sees through the reflective or partially reflective screen 411, from both the front and back of the set-up, regardless of whether an anti-reflective coating is used.

The reflective or partially reflective screen 411 can include materials discussed elsewhere herein. In some embodiments, the reflective or partially reflective screen 411 is a foil, such as a polymeric foil, which can have a partially reflective coating upon a front face of the foil (i.e., the side facing the display screen of the portable electronic device 10). The foil screen may be rolled about a cylinder disposed adjacent to hinge 412 when not in use.

In use, the foil screen is unrolled and retained within a box frame that is coupled to hinge 412 such that box frame can be pivoted between a 0° and 45° angle relative to the display screen of a portable electronic device when the clamp is attached thereto. In certain embodiments, the foil screen is attached to the box frame using tensioning straps and a pair of clamp jaws, as described in U.S. Pat. No. 7,883,212, the contents of which are herein incorporated by reference in its entirety. As described in U.S. Pat. No. 7,883,212, the tension straps are adjustable to allow an even tension to be applied over the whole surface of the foil screen thereby reducing, and ideally eliminating, the formation of wrinkles upon the foil screen which reduce the quality of an image projected upon the screen.

The projector accessory 400 can be dimensioned to fit any portable electronic device having a display screen, such as any of those listed elsewhere herein.

Figure 8:
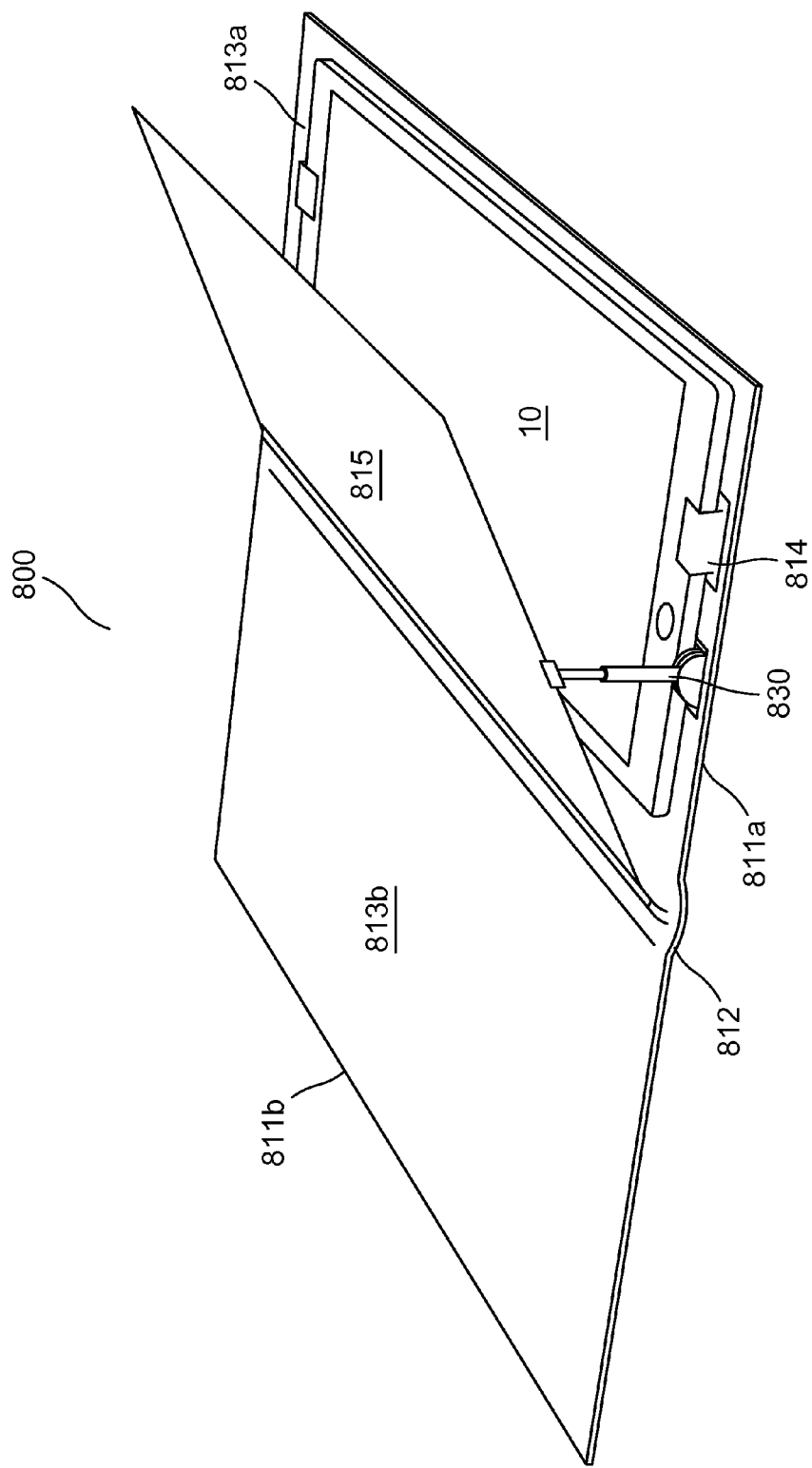
FIG. 8 shows a screen with a cover housing a device according to certain embodiments.

FIG. 8 shows a cover 800 for a portable electronic device 10 that includes a reflective or partially reflective screen 215 for projecting content displayed on the display screen of the portable electronic device 10, in accordance with one embodiment of the present invention. The cover 800 includes first leaf 811a, optional second leaf 811b, and a spine 812 disposed in between the two leafs, each of the leafs and spine having an exterior surface and an interior surface. The cover 800 is configured to wrap around the exterior surfaces of the portable electronic device 10 like a book cover (as also shown in FIG. 1).

The interior surface of the cover 800 includes two inner faces, 813a (the inner face of first leaf 811a) and 813b (the inner face of second leaf 811b), disposed on opposite sides of the spine 812.

The inner face 813a of first leaf 811a may include one or more tabs 814 disposed within cover 800 to secure electronic device 10 in place. Tab 814 can have an overhang that is spaced apart from inner face 813a by a distance that represents a common, or standard, thickness of an electronic device (e.g., the thickness of the tablet computer sold under the trademark IPAD by Apple (Cupertino, Calif.)).

The cover 800 further includes a reflective or partially reflective screen 815 having materials or properties as discussed above. Cover 800 can further include one or more of strut 830 (i.e., plastic or metal rod) attached to the cover that can be used to prop screen 815 into its functional position. Two of strut 830 (or more) can be used for greater stability or aesthetics. Strut 830 can be provided that folds down and is optionally retained in an optional plastic clasp for storage. Screen 815 may have a plastic tab and divot, or the strut may have a plastic clip, which can position the screen in an angle above the device display. In certain embodiments, strut 830 is mounted in a swiveling hinge at face 813a and has a press-fit clasp at the other end, as shown in FIG. 8.

Figure 9:
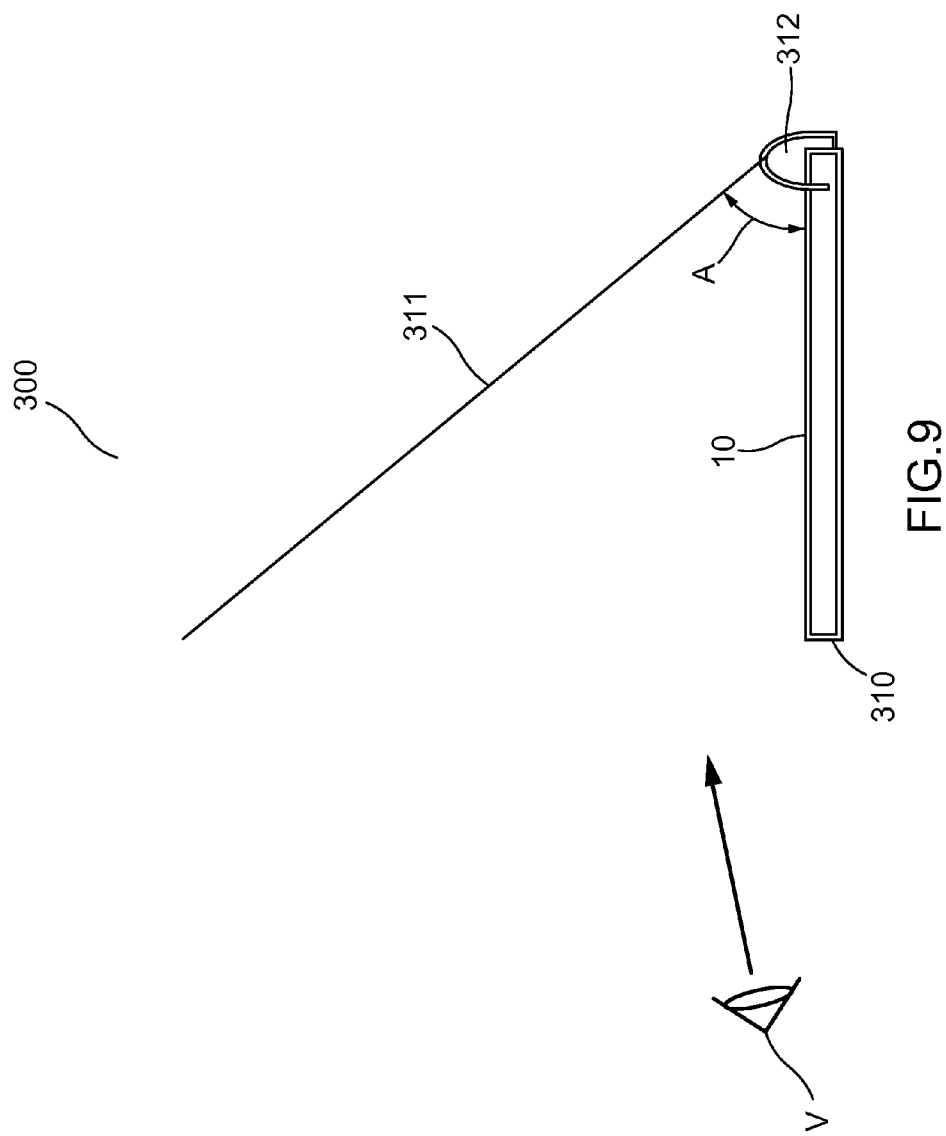
FIG. 9 gives a side view of a projector accessory according to certain embodiments.

FIG. 9 presents another view of a projector assembly 300. Base 310 is connected to screen 311 via hinge 312. Device 10 mounts to or sits on base 310. A viewer V sees an image on screen 311 of the contents of a display of device 10 when screen 311 is disposed at an angle A to a face of device 10. Angle can be between about 30° and about 60°, preferably between about 40° and 50° (e.g., 45°).

A device 10 can have a display with a width WD approximately equal to, or a little bit smaller than a width WB of base 310. Screen 311 can have a width W such that W is approximately equal to WD or WB. In certain embodiments, W is dimensioned such that (W/WD) or (W/WB) is at least or approximately cos A where, for example, A is 45°.

Figure 10:
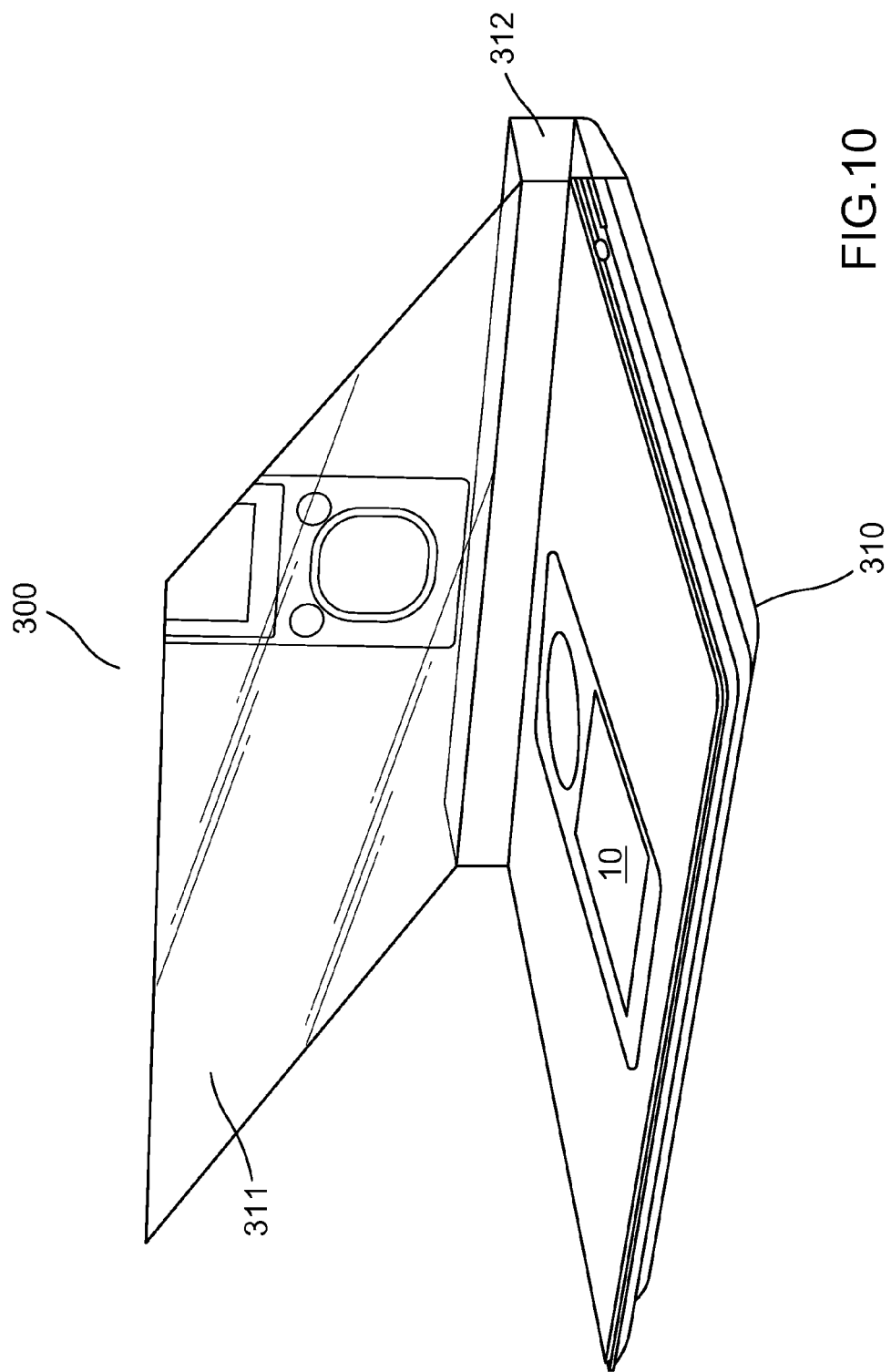
FIG. 10 is a perspective view of a projector accessory.

FIG. 10 gives a perspective view of cover 300, showing screen 311 connected to base 310 via hinge 312. As can be seen in FIG. 10, device 10 can be smaller than screen 311. For example, screen 311 can be dimensioned to correspond to a certain tablet computer, and can house a device 10 that is a small portable digital music player. In some embodiments, base 310 includes one or more of a speaker or a coupling to dock a music player. Any audio played by device 10 is played from base 310. In certain embodiments, screen 311 reflects sound as well as light to a viewer V.

FIG. 11A is a side view of a device of the invention and FIG. 11B gives a back view of a device of the invention. As can be seen in FIGS. 11A and 11B, device 900 includes screen 911 attached to base 910. Base 910 includes a tray area 905 to receive an electronic device 10 (not pictured). Device 900 includes kickstand 909 that optionally folds into a recess in the underside of base 910 to allow device 900 to sit flat.

Projector accessory 300 was built and appears as depicted in FIG. 12. FIG. 12 gives a front perspective view of accessory 300 showing screen 311 disposed at a 45° angle above a screen of electronic device 10 (here, a tablet computer sold under the trademark IPAD by Apple (Cupertino, Calif.)). Device 10 is housed in base 310.

In certain aspects, the invention provides a projector/reflector accessory for use with an electronic device in which the accessory has a spare or minimalistic structure. For example, FIG. 13A shows a foldable accessory according to certain embodiments. As can be seen in FIG. 13A, accessory 700 can be used without reference to any cover for a device (although one may optionally be provided with device 700). Referencing FIGS. 13A and 13B, it can be seen that accessory 700 has a collapsing leg portion 710 that couples to armature 730 to hold screen 711 above an electronic device (not shown). Looking particularly at FIG. 13A, it can be seen that a tablet computer or other electronic device may be seated on accessory 700, particularly on the extendable protruding struts of leg portion 710.

Figure 13B:
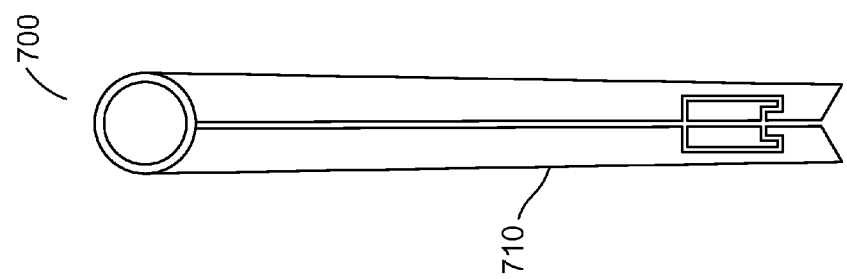
FIG. 13B shows the leg portion of the accessory shown in FIG. 13A folded closed.
Figure 13A:
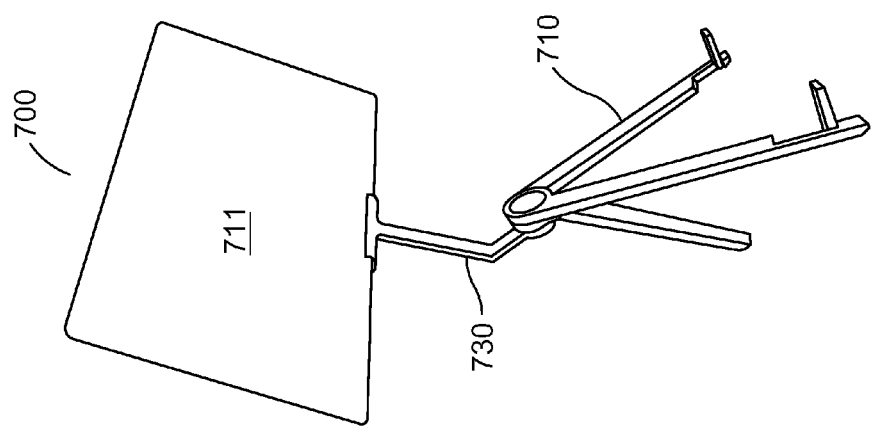
FIG. 13A shows a foldable accessory according to certain embodiments.
Figure 13C:
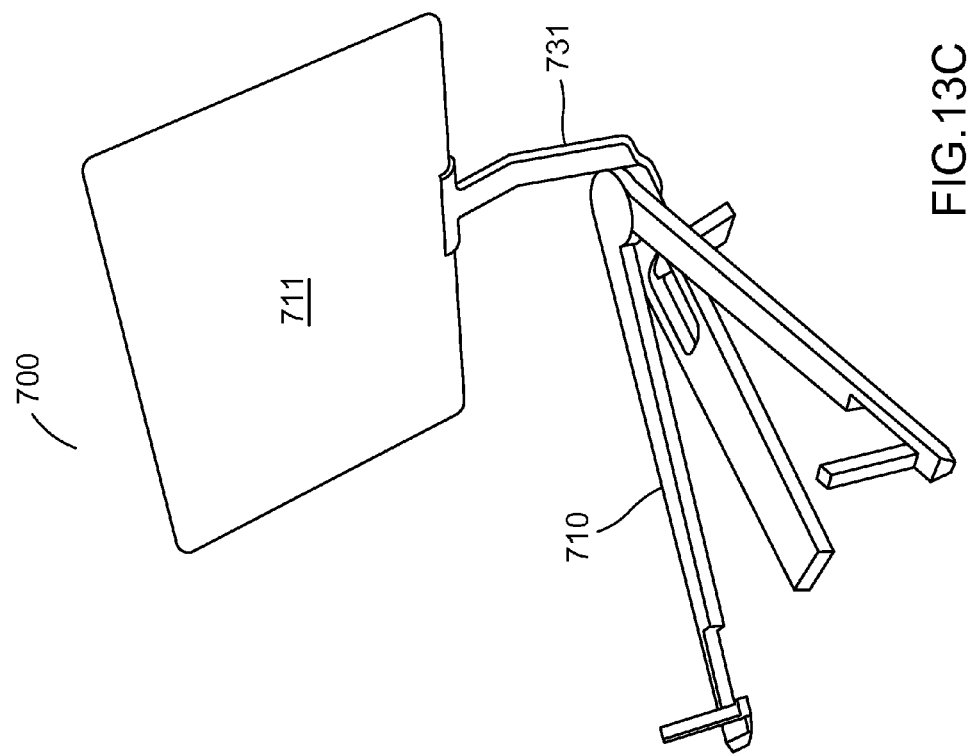
FIG. 13C shows the accessory shown in FIG. 13A in an alternative disposition.

A foldable accessory such as that shown in FIGS. 13A, 13B, and 13C may include a hinged or flexible armature 730 or a removable/swappable armature 730. For example, armature 730 (FIG. 13A) can be swapped for armature 731 (FIG. 13C) or each can represent a single piece folded between different configurations.

FIG. 13C shows accessory 700 in an alternative disposition. As can be seen in FIG. 13C, an electronic device would sit close to, but off of, a flat surface, supported by four feet. Foldable accessory 700 is particularly useful where it is desirable to keep an electronic device off of a surface for example, for heat management purposes. Device 700 also offers a particularly attractive and visually interesting display for a retail or public setting. An electronic device can be seated on leg portion 710 and a display of the device can be seen by passerby as well as a re-display, or holographic projection of the display, in screen 711.

In certain embodiments, device 700 includes components provided by a mobile stand for electronic devices such as the mobile stand sold under the trademark COMPASS by Twelve South LLC (Mount Pleasant, S.C.) (i.e., the "Compass Mobile stand for iPad"). Device 700 can further include any combination of base legs for leg portion 710 and screen 711 with optional armature 730 to hold screen 711 spaced away from leg portion 710. The legs, the armature, or both can include metal, plastic, reinforced fiberboard, a polymer, leather, or any other material known in the art.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. An accessory for a portable electronic device, the accessory comprising:
    a spine coupled to a first leaf and a second leaf, wherein the first leaf, the second leaf, and the spine define a book-style form factor;
    a plurality of tabs disposed on an inner face of the first leaf to secure a portable electronic device, wherein each of the plurality of tabs comprises an overhang that is spaced apart from the inner face by a distance that represents a thickness of the portable electronic device;
    a reflective screen coupled to the spine via a hinge and configured to pivot around an axis of the hinge relative to the leaf; and
    a mechanism to hold the reflective screen at an angle that is between about 35 degrees and about 50 degrees above the portable electronic device when the portable electronic device is secured in the plurality of tabs, wherein the mechanism comprises at least one strut and a plastic clasp for storage of the strut.

2. The accessory of claim 1, wherein the screen is partially reflective and partially transmissive.

3. The accessory of claim 1, wherein the angle is approximately 45°.

4. The accessory of claim 1, wherein the angle is 45°.

5. The accessory of claim 1, wherein the each of the plurality of tabs comprises a protrusion dimensioned to correspond to a feature of the electronic device.

6. The accessory of claim 1, wherein the screen comprises a beam splitter.

7. The accessory of claim 1, further comprising a material selected from the list consisting of leather, vinyl, fabric, latex, rubber, and silicone.

* * * * *